United States Patent [19]
Kilberis

[11] 4,277,074
[45] Jul. 7, 1981

[54] KEYLESS CHUCK

[76] Inventor: Harry Kilberis, 4411 Stallion Brook La., Spring, Tex. 77379

[21] Appl. No.: 97,366

[22] Filed: Nov. 26, 1979

[51] Int. Cl.³ .................. B23B 31/06; B23B 31/16
[52] U.S. Cl. .................................... 279/60; 279/62
[58] Field of Search ............... 279/1 A, 1 K, 60, 61, 279/62, 110; 192/56 R

[56] References Cited
U.S. PATENT DOCUMENTS

| | | | |
|---|---|---|---|
| 952,149 | 3/1910 | Smith et al. | 279/51 |
| 1,124,008 | 1/1915 | Garrett | 279/51 |
| 1,272,109 | 7/1918 | Robbins | 279/51 |
| 1,684,633 | 9/1928 | Levedahl | 192/56 R X |
| 2,401,071 | 5/1946 | Hillberg | 279/51 |
| 2,599,026 | 6/1952 | Strayer | 81/112 |
| 2,684,856 | 7/1954 | Stoner | 279/110 X |
| 3,070,380 | 12/1962 | Holmberg | 279/51 |
| 3,235,277 | 2/1966 | Bernier | 279/51 |
| 3,746,353 | 7/1973 | Allen | 279/1 A X |
| 3,834,252 | 9/1974 | Abell et al. | 192/52 RX |

*Primary Examiner*—Robert D. Baldwin
*Attorney, Agent, or Firm*—Bard & Groves

[57] ABSTRACT

Apparatus is provided for opening and closing the jaws of a chuck without the use of a key. This invention is particularly suitable for improving a standard drill chuck so that tools can be easily and rapidly changed without the use of a drill chuck key. In one embodiment of the invention, the first ring element containing a pair of dogs is slidably mounted to the collar of the drill chuck. When the drill is activated and the first ring element is in an upper position, its dogs engage opposing dogs on a stationary second ring element. Relative rotary motion is thereby achieved between the jaws and the collar of the drill chuck which, in turn, tightens the jaws about the tool. Resilient means are provided for yielding to allow the first ring element to be pushed downward by the action of the opposing dogs when the jaws have closed about the tool.

14 Claims, 11 Drawing Figures

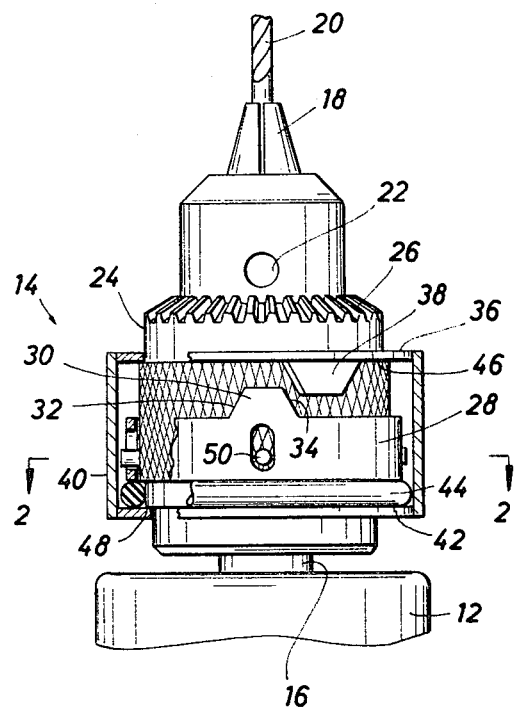
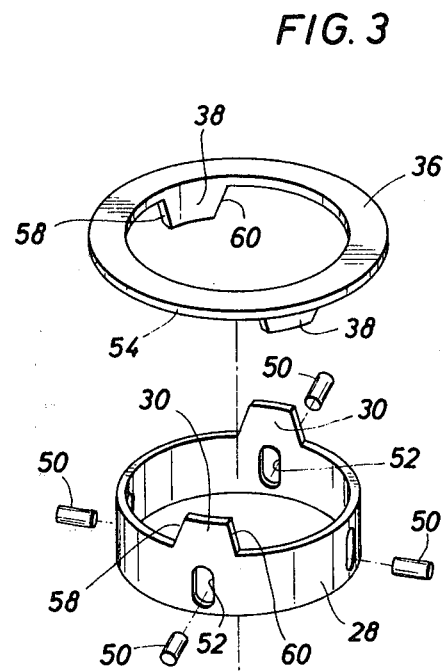
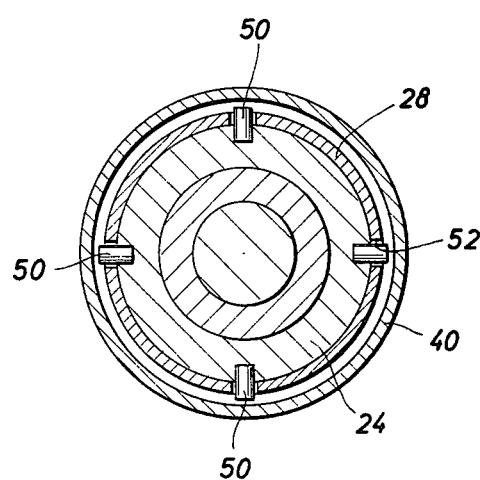
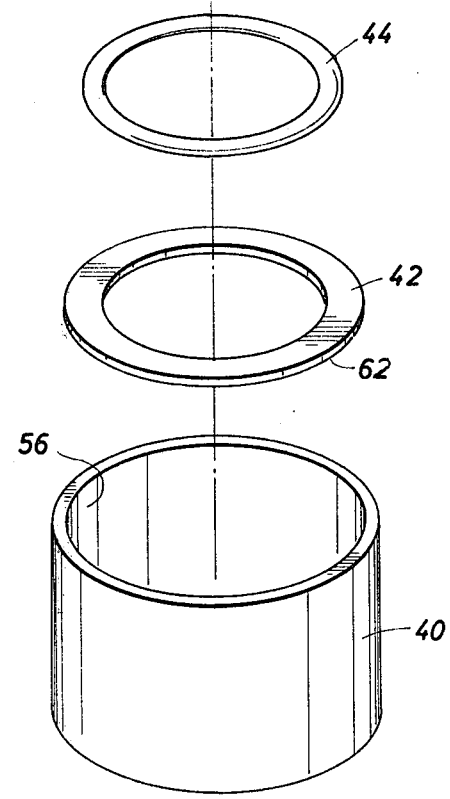

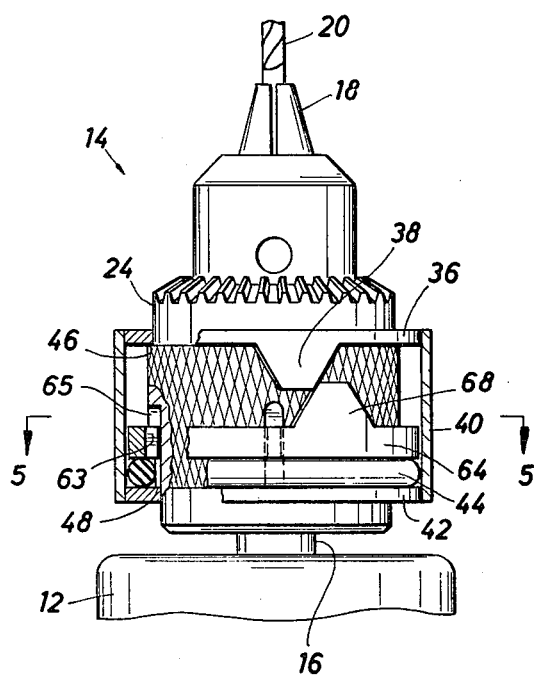
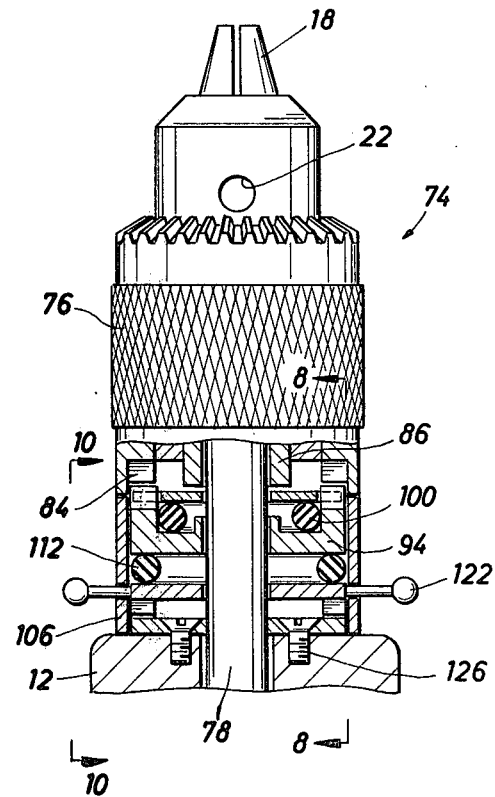
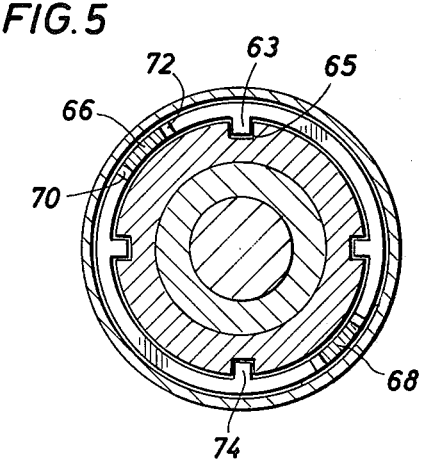
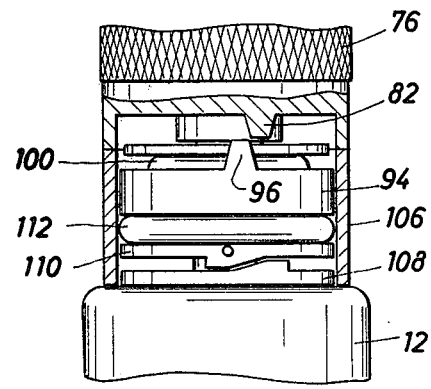

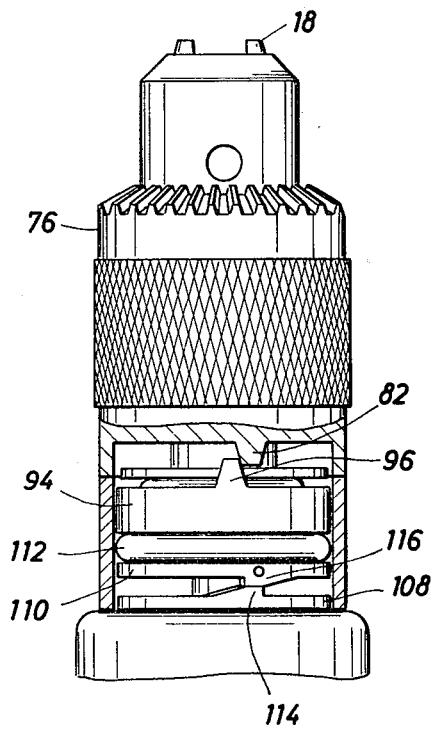
FIG.9
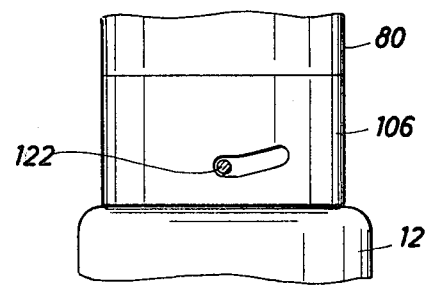
FIG.10
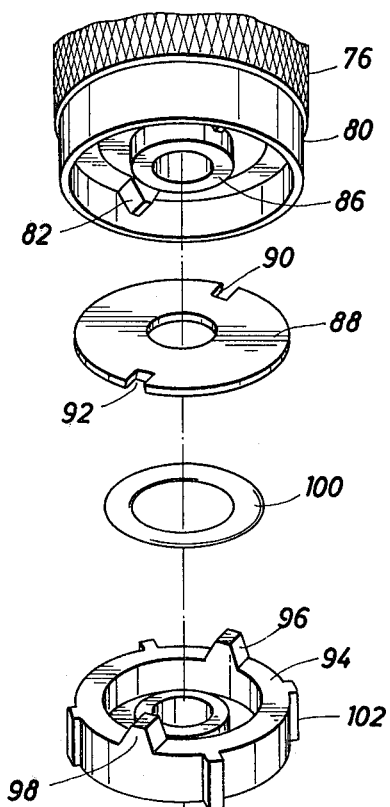
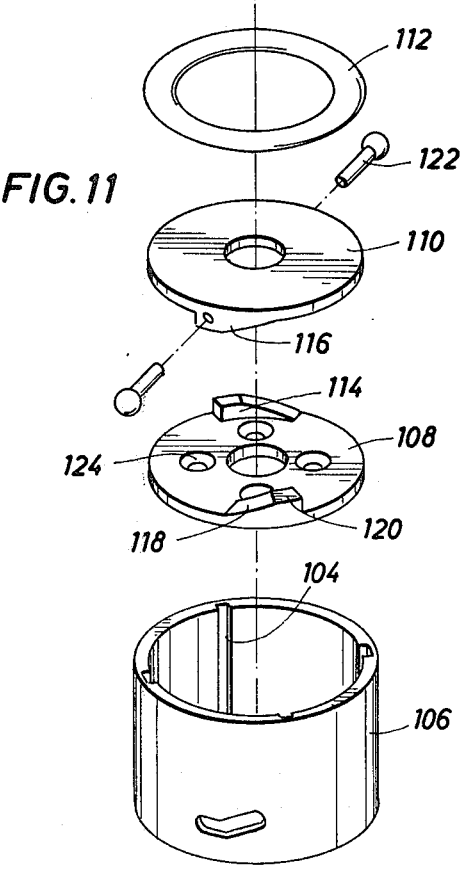
FIG.11

KEYLESS CHUCK

BACKGROUND OF THE INVENTION

This invention relates to methods and apparatus for tightening and loosening the jaws of a chuck about a work tool. The invention is particularly suitable for opening and closing the jaws of a drill chuck in reversible drill motors without the use of a key.

There are many types of chucks available for holding a work tool in the machine. Chucks may simply be made from from a collet employing a set screw to hold the tool. Independent chucks are available in which the jaws of the chuck may be set independently of each other. Other chucks employ magnetic forces to hold the work tool in place. Probably the most popular chuck, however, is commonly called the universal chuck or drill chuck. In a drill chuck, the jaws move simultaneously to center the tool in the chuck. This invention is suitable for use with a universal or drill chuck, and is particularly applicable to drills with reversing motors.

In drill chucks, the jaws are caused to clamp or release the work tool because of relative rotary movement between the jaws and the collar external to the jaws. In many drill chucks, rotation of the collar causes a threaded, tapered piece to exert force against the jaws, thus clamping the tool. Typically, drill chucks employ a "key" which is inserted into the chuck and rotated to cause rotary movement of the collar and thus clamp the tool.

This invention is suitable for use with a drill chuck whereby clamping or releasing a tool is achieved by relative rotary movement between the jaws and the drill chuck collar. In the instant invention, however, apparatus is provided so that the tool may be clamped or released without the use of a standard drill chuck key.

Drill chuck keys are generally accepted as a standard device for clamping or releasing a tool within a drill chuck. The use of the drill chuck key, however, has several major drawbacks. First, since the drill chuck key is not attached to the drill itself, the operator must locate the key each time the tool is to be changed. Second, employing a drill chuck key to change tools is difficult or impossible if the operator is in an awkward location. Third, changing the tool with a drill chuck key takes a considerable amount of time and effort.

Consider, for example, an operator assigned the task of drilling a plurality of holes while standing on a conventional ladder. Each time he desires to change the drill bit, he must first locate the key. Assuming he has become tired of climbing down the ladder to locate the key each time a drill bit is to be changed, the operator may decide to tie the key on a string with the other end of the string being tied to a portion of the drill. This practice, however, is often found to be unmanageable since the key and string get wrapped about objects and often reduce the mobility of the operator and may cause an unsafe condition.

Assuming the operator is on the ladder and already has a key, the next step is to insert the key in the chuck to cause rotary movement of the collar. Depending on the dexterity of the operator, the size of the drill, the locking grasp of the jaws to the work tool and other factors, this may be no easy task while the operator is standing on the ladder. If the operator is to break the jaws from the tool or tighten the jaws about the tool with the necessary force, it may require that the operator get down from the ladder so that he can manage turning the key in the chuck. Also, the experienced operator may realize that if he does not firmly grasp the chuck in one hand and the key in the other, he may not achieve proper alignment of the teeth on the key with the teeth on the collar. If the key is not properly aligned, the drill bit may either not be properly grasped by the jaws, or the teeth on the collar or the key may become stripped. Since the operator on the ladder may not safely be able to simultaneously hold the drill, grasp the chuck, and turn the key, or the operator may not be willing to chance that the teeth on the key or chuck may become stripped, the operator may opt for the safest procedure and again climb from the ladder to change the drill bit.

Even if the drill bit can be changed with a drill chuck key while the operator is on the ladder, it is apparent from the above that changing the tool is not necessarily a simple matter. Use of the drill chuck key may result in a considerable amount of time and effort being utilized to change the tool, and this time and effort is multiplied by the number of tool changes required for a given operation.

The instant invention provides methods and apparatus for tightening and loosening the jaws of a drill chuck about a work tool without the use of a key or other tool external to the drill. The disadvantages of a prior art are therefore overcome with the present invention, and novel methods and apparatus are hereinafter provided for easily and rapidly changing tools in a standard drill chuck.

SUMMARY OF THE INVENTION

In an exemplary embodiment of this invention, a first ring member is slidably mounted to the collar of the drill chuck. Secured to the first ring member are a pair of tapered, upward pointing dogs which are designed to engage opposing downward facing dogs on a second ring member. A sleeve enclosing the ring members is attached at one end to the second ring member and at the other end to a third ring member located below the first ring member. Sandwiched between the first ring member and the third ring member is a resilient means which generally holds the first sleeve member in its uppermost position.

During the normal drilling operation, the collar of the drill chuck is rotating which, in turn, causes rotation of the first ring member. The resilient means causes the first ring member to be in an upper position, so that the dogs of the first ring member engage the dogs of the second ring member. During normal drilling operations, this engagement of the dogs causes the second ring member, the sleeve, and the third ring member to rotate freely with the collar of the drill chuck and the first ring member.

As previously explained, the drill bit or tool may be changed by causing relative rotary movement between the jaws and the collar of the drill chuck. To achieve this relative rotary movement, the operator merely grasps the sleeve with one hand before energizing the drill motor. When the drill motor is then energized, the second ring member, the sleeve, and the third ring member are held in a stationary position. Operation of the drill motor causes the rotation of the first ring member with the collar of the drill chuck. When the opposing jaws of the first ring member engage the jaws of the stationary second ring member, the rotary motion of the first ring member and of the drill collar is interrupted. Since the drill motor and the jaws are continuing to rotate as the collar is briefly held in a stationary position, relative rotary movement is achieved between the jaws and the drill chuck collar.

Assuming that the relative rotary movement between the jaws and the drill chuck collar is causing the jaws to close about a work tool, the relative rotary motion may continue until the jaws engage the work tool. At this point, only a minute amount of rotary movement is possible between the jaws and the drill chuck collar. Also, the jaws will achieve an increased grasp on the tool with a relatively minor amount of inward movement. Thus, when the jaws close about the tool, the first ring member is no longer held in a stationary position by the engagement of the opposing jaws on the first and second ring members. Rather, the engagement of these tapered jaws and the relative rotary motion between the first and second ring members causes the first ring member to be pushed downward toward the third ring member. The downward movement of the first ring member is opposed by resilient means which compresses to allow the dogs to pass one another. After the dogs have passed, the resilient means again forces the first ring member to its upper position. In a very brief interval of time, however, the collar has rotated 180° and the other dog on the first ring member engages the opposing dog on the second ring member. This action of engagement of the dogs, a downward push on the first ring member and compression of the resilient means, and the disengagement of the dogs with the upward push on the first ring member by the resilient means results in a "knocking" action of the dogs. This knocking action is significant since the repeated contact of the dogs in rapid succession causes the jaws to firmly grasp the drill bit or tool. After the tool has been secured by the jaws in this manner, the operator releases his hold on the sleeve and the drill is again ready for use.

In another embodiment of this invention, the jaws are caused to clamp or release a tool when the downward facing dogs on a rotatable first ring member engage upward facing opposing dogs on a non-rotatable, axially positionable second ring member. In this embodiment, during normal use the dogs would not come into contact since there is a small distance separating the dogs on the first ring member from the dogs on the positionable second ring member. If the jaws are to be opened or closed, the second ring member is moved axially and positioned so that the opposing dogs are caused to engage each other. This engagement is in a manner similar to the engagement described above, with the same "knocking" effect of the dogs to achieve secure tightening of the jaws on the tool. The axial movement of the second ring member results from a limited angular movement of a first disk member with respect to a second disk member, with each disk member having a pair of inclined surfaces at its periphery. During normal operation of the drill, these inclined surfaces lie adjacent one another and the first ring member is in its lower position. If the jaws are to be opened or closed, however, one disk member is rotated by a handle means so that the inclined surfaces engage to lift upwardly the second disk member. This upward motion, in turn, produces an upward axial movement of the second ring member, which causes the dogs on the first and second ring members to engage when the drill motor is operated. This latter embodiment has the advantage that the operator can simply turn the handle means and subsequently activate the drill motor to open or close the jaw members. Thus, the jaw members can be caused to grasp or release the tool with the simple one-handed activation of the drill motor.

In both of the embodiments described above, the operation of the drill motor will cause the jaws to either open or close on the tool depending on the specific threading of the internal workings of the chuck. For instance, if clockwise rotary motion of the collar with respect to the jaws tightens the jaws about the work piece, the same tightening effect of the jaws can be achieved if the jaws are caused to rotate counter-clockwise by the activation of the drill motor, since the apparatus described herein retards the counter-clockwise rotation of the collar. Although this invention can therefore be employed with a drill motor that can operate in one direction, the apparatus described herein will not be able to both open and close the jaw members about the tool. If a drill motor can only rotate in one direction, the apparatus described herein will be able to either tighten or loosen the jaws about the tool, but may not perform both operations. The full benefits of my invention will therefore be achieved by utilizing the methods and apparatus described herein in conjunction with a drill motor that can operate in either the clockwise or counter-clockwise direction. Drill motors capable of turning in either direction are commonly referred to as reversible drill motors, and it is a particular feature of this invention to employ the methods and apparatus described herein in conjunction with a reversible drill motor to tighten or loosen the jaws of a drill chuck about a work tool without the use of a key.

It is therefore a feature of this invention to provide for opening and closing the jaws of a chuck by retarding the rotary movement of a collar of the chuck in relation to the jaws which are rotated by the drill motor.

It is a further feature of this invention to provide apparatus for opening and closing the jaw members of a chuck wherein the ultimate opening or closing force of the jaw members on the tool is assisted by the knocking of dog members.

Yet another feature of this invention is to provide apparatus for changing the tool in a drill chuck by employing a stationary ring member with dogs and a rotary ring member with opposing dogs, wherein one of the ring members is axially moveable in relation to the chuck and wherein said axial movement is opposed by a resilient means.

These and other features and advantages of this invention will become apparent in a foregoing detailed description, when reference is made to the figures in the accompanying drawings.

IN THE DRAWINGS

FIG. 1 is a pictorial representation, partly in cross-section, of an exemplary embodiment of the invention.

FIG. 2 is a cross-sectional representation of the apparatus depicted in FIG. 1.

FIG. 3 is a pictorial representation, in exploded format, of a portion of the apparatus depicted in FIG. 1.

FIG. 4 is a pictorial representation, partly in cross-section, of another embodiment of the invention depicted in FIG. 1.

FIG. 5 is a cross-sectional representation of the apparatus depicted in FIG. 4.

FIG. 6 is a pictorial representation of a portion of the apparatus depicted in FIGS. 4 and 5.

FIG. 7 is a pictorial representation, partly in cross-section, of another embodiment of the invention depicted in FIG. 4.

FIG. 8 is a cross-sectional representation of a portion of the apparatus depicted in FIG. 7.

FIG. 9 is another pictorial representation, partly in cross-section, of the embodiment of the invention depicted in FIG. 7.

FIG. 10 is pictorial representation of the portion of the apparatus depicted in FIG. 7.

FIG. 11 is a pictorial representation, in exploded format, of a portion of the apparatus depicted in FIGS. 7 and 9.

DETAILED DESCRIPTION

FIG. 1 is a pictorial representation of one embodiment of the present invention. A portion of a drill motor housing 12 is shown, which may contain a standard electrically-operated drill motor (not depicted). A drill chuck 14 is illustrated on the end of rotatable shaft 16 which exits from a drill motor housing 12. A plurality of jaws 18 are shown at the upper end of drill chuck 14, and contain a tool 20, which may be a drill bit or any one of a variety of tools generally used with drill motors. A standard drill chuck key (not depicted) may be inserted in aperture 22 to cause rotation of chuck collar 24 by engagement of the teeth on the drill chuck key with mating teeth 26 on the chuck collar 24. Rotation of the chuck collar 24 with respect to the jaws 18 causes radial movement of the jaws 18. For instance, in many drill chucks, a threaded tapered piece is connected to the chuck collar 24, and rotation of the threaded tapered piece exerts a force on the jaws 18 sufficient to clamp the tool 20 in the jaws 18.

As described above, relative rotational movement between the chuck collar 24 and the jaws 18 causes the jaws 18 to clamp or release a tool 20. The present invention achieves this relative rotation between the chuck collar 24 and the jaws 18 without the use of a standard drill chuck key. In addition, the apparatus described herein is fully capable of causing sufficient torque on the chuck collar 24 so that a tool 20 may be securely grasped in the jaws 18, and, although additional torque may be applied with a standard drill chuck key, such additional torque should generally not be necessary according to the present invention. It is apparent that a variety of mechanisms could be used which would cause the jaws 18 to clamp or release a tool when the chuck collar 24 is rotated relative to the jaws. Only one such apparatus is briefly described herein, since this invention may be employed in any number of chucks wherein the jaws 18 are caused to clamp or release a tool 20 based on the movement of a chuck collar 24.

In FIG. 1, there is shown a first ring member 28 mounted for rotation with the chuck collar 24. Secured to the first ring member 28 is an upward-facing first dog member 30 with inclined surfaces 32 and 34. A second ring member 36 having a second dog member 38 is positioned above the first ring member 28. A sleeve 40 is shown secured to the second ring member, and is also secured to a third ring member 42. A standard O-ring 44 is shown sandwiched between the first ring member 28 and the third ring member 42, and the O-ring 44 may be made from any number of flexible materials, including rubber or plastic. As shown in FIG. 1, the second ring member 36, the sleeve 40, and the third ring member 42 are held in place by the engagement of the lower surface of the ring member 36 on a lip 46 of the chuck collar 24, while the upper surface of the third ring member 42 shown is in engagement which a similar lip 48.

Referring to both FIGS. 1 and 2, it may be seen that a plurality of pins 50 are secured in the chuck collar 24 and have projections extending radially outward from the chuck collar. Further, the first ring member 28 is shown to contain a plurality of slots 52 which serve as guide means to allow axial movement of the first ring member 28 with respect to the chuck collar 24, but limit the rotational movement of the first ring member 28 with respect to the chuck collar 24. Thus, it may be seen that the first ring member 28 is mounted for rotation with the collar 24. The second ring member 36, the sleeve 40, and the third ring member 42 are not secured for rotation with the chuck collar 24. Engagement of the first dog members 30 and the second dog members 38 will generally cause the second ring member 36, the sleeve 40, and the third ring member 42 to rotate freely with the chuck collar 24 as the drill chuck 14 is rotated. The frictional engagement of the second ring member 36 and the third ring member 42 on the chuck collar 24 is such that the sleeve 40, the second ring member 36, and the third ring member 42 may be held stationary while the chuck collar 24 is rotating.

Referring now to FIG. 3, there is an exploded pictorial representation of the portion of the apparatus depicted in FIG. 1. More particularly, there is shown the second ring member 36 containing a pair of downward facing second dog members 38. The outer edge 54 of the second ring member 36 may be secured to the inner wall 56 of the sleeve 40 by any convenient means, e.g., tack welding. In the alternative, the second ring member 36 may be secured to the sleeve 40 by means of conventional screws (not depicted). The first ring member 28 is shown to contain four slots 52 for accommodating four pins 50 which are secured in the chuck collar 24. As previously explained, the purpose of the pins 50 in the slots 52 is to allow axial movement of the first ring member 28 with respect to the chuck collar 24, while limiting the rotational movement of the first ring member with respect to the chuck collar 24.

Although any number of pins 50 in corresponding slots 52 may be used, the suitable embodiment depicted in FIG. 3 shows four pins and four slots equally spaced around the ring member 36. Further, two of the slots are illustrated to be in axial alignment with a pair of upwardly-facing first dog members 30. It should be noted that the first dog members 30 and the second dog members 38 each have inclined surfaces 58 and 60. These inclined surfaces allow for easier passage of the first dog members 30 and the second dog members 38, in a manner more fully described below. Also, these inclined surfaces produce an axial force when the dogs are rotated relative to one another, which causes axial movement of one of the dog members away from the other dog member. Although both dog members 30 and 38 are shown to have inclined surfaces 58 and 60, one such inclined surface may be used, and the inclined surface may be on only one of the dog members 30 or 38.

Also shown in FIG. 3 is a resilient means which is suitably shown as a rubber O-ring 44. When assembled, the O-ring 44 is sandwiched between the bottom of the first ring member 28 and the top of the third ring member 42. The resilient member 44 is shown to have a circular cross-section, although some other configuration, such as a square or rectangular cross-sectional member could also be used. Any suitable resilient means can be employed instead of or in addition to the O-ring 44. For instance, a simple metallic spring member (not depicted) could be used instead of the O-ring 44.

The outer edge 62 of the third ring member 42 may be fastened to the sleeve 40 as depicted in FIG. 1 by any convenient means, such as that previously described in connection with the second ring member 36 and the sleeve 40.

The operation of the apparatus depicted in FIGS. 1-3 will now be described. As previously explained, the drill chuck 14 is of the type wherein relative rotational movement between the jaws 18 and the chuck collar 24 causes radial movement of the jaws 18 to clamp or release the tool 20. Referring now to FIG. 2, it will be assumed that clockwise rotation of the chuck collar 24 with respect to the jaws 18 will cause the jaws 18 to move radially inward to grasp the tool 20. Initially, it will be assumed that the jaws 18 are in an open condition and that an operator desires to secure tool 20 within the jaws. The operator may first grasp the sleeve 40 with his hand to prevent the second ring member 36, the sleeve 40, and the third ring member 42 from rotating. The drill motor may then be activated in the forward direction, which will cause rotation of the shaft 16, the chuck collar 24, and the jaws 18. Referring to FIG. 2, the direction of rotation of the shaft 16, the chuck collar 24, and the jaws 18 will be in the counter-clockwise direction when the drill is activated in the forward direction.

Since the chuck collar 24 is rotating in the counter-clockwise direction, it is apparent that the first ring member 28 will also rotate in the counter-clockwise direction. As shown in FIG. 1, the first dog members 30 and the second dog members 38 overlap in a horizontal plane, and thus the rotating first dog 30 will come into engagement with the stationary second dog member 38. When these dog members engage, the counter-clockwise rotation of the first ring member 28 and the chuck collar 24 is interrupted. Thus, the chuck collar 24 is briefly being held in a stationary condition because of the engagement of the first dog members 30 with the second dog members 38. Since the shaft 16 and the jaws 18 continue to rotate in a counter-clockwise direction while rotation of the chuck collar 24 is interrupted, the effect of this operation is to cause clockwise movement of the chuck collar 24 with respect to the jaws 18. As previously explained, this clockwise rotation of the chuck collar 24 with respect to the jaws will cause the jaws 18 to move radially inwardly on the tool 20.

Once the jaws 18 come in contact with the tool 20, further inward movement of the jaws 18 is restricted. Since the operator continues to grasp the sleeve 40 and maintain the second ring members 36 in a stationary position, further relative rotation of the chuck collar 24 with respect to the rotating jaws 18 is also limited. At this point, therefore, the engagement of the first dog members 30 on the second dog members 38 produces an axially directed force on the first ring member 28 and forces the first ring member 28 toward the drill motor housing 12. As seen in FIG. 1, the first dog member and the second dog member have tapered or inclined surfaces to which allow dog members to pass by one another while forcing the first ring member 28 in the downward direction. Downward axial movement of the first ring member 28 is permitted because of the slots 52 previously referred to. As the first ring member 28 is pushed downward, the O-ring 44 is compressed. The O-ring 44 continues to be compressed as the first ring member 28 is pushed downwardly to allow the first dog members 30 to pass by the second dog members 38. Once these dog members has passed by each other, a resilient means such as the O-ring 44 returns the first ring member 28 to its upward position.

As previously explained, once the jaws 18 have moved radially inward to contact the tool 20, further radial movement of the jaws is limited. The compressional force of the jaws upon the tool 20 however, can be increased substantially by causing very minute rotational movements between the chuck collar 24 and the jaws 18. Thus, once the first dog member 30 has come into engagement with the second dog member 38, and the first ring member 28 is pushed downward to allow the dog members to pass by one another, the operator may continue to secure the sleeve 40 against rotation while activating the drill motor. At this stage, the first dog member 30 is rotating and will produce an effect known as "knocking" or "hammering". This "knocking" is achieved since the first dog member is going through repeated stages where the first dog member 30 strikes or impacts the second dog member 38, the first dog member 30 is pushed downwardly against the O-ring 44 to allow the first dog member 30 to pass by the second dog member 38, and the O-ring 44 thereafter returns the first dog member 30 to its upward position in time for the subsequent repeated engagement with a second dog member 38. This knocking or hammering of the dog members is advantageous since it has the affect of increasing the grip on the tool 20 by the jaws 18.

In the operation described above, the operator grasps the sleeve 40 with one hand to restrict the rotation of the first ring member 28 and the third ring member 42. This operation can be easily accomplished by the operator, and is not physically tiresome for an operator. Further, there are no projections or sharp edges which could present an unsafe condition for the operator. Once the jaws 18 contact the tool 20, knocking of the dog members enables the operator to maintain a fixed grip on the sleeve 40. If desired, a pliable gripping material may be added to the outer surface of the sleeve 40 to assist the operator in preventing rotational movement of the second ring member 36 and the third ring member 42. For example, a thin strip of rubber may be glued to the sleeve 40 and thereby assist the grip of the operator. If desired, a tool (not depicted) may be used by the operator to maintain the fixed position of the sleeve 40 when the chuck collar 24 is rotating, although the use of a tool is not necessary according to my invention and has some of the disadvantages associated with using a standard drill chuck key.

Once the tool 20 has been sufficiently secured in the jaws 18, the drill is ready for use. During normal use of the drill, the chuck collar 24 is rotating with the jaws 18 and the tool 20. The first ring member 28 is secured for rotation with the chuck collar 24, and the second ring member 36 and third ring member 42 may rotate freely with the chuck collar 24. In FIG. 1, a standard drill chuck is shown with apparatus representing an embodiment of my invention. This apparatus may therefore be added to a standard drill chuck 14, or may be incorporated in the design of the drill chuck 14 when manufactured. As shown in FIG. 1, this apparatus does not substantially increase the diameter of the chuck collar 24 and does not add any length to the drill chuck 14. Thus, the apparatus added to the drill chuck 14 does not add appreciable weight to the drill chuck, and the drill chuck 14 remains compact and versatile.

After the drilling operation is completed, the operator may desire to change tool 20. In order to cause the jaws 18 to release the tool 20, the operator grasps the sleeve 40 in the manner described above. The drill motor is thereafter briefly activated in the reverse direction while preventing rotational movement of the second ring member 36 and the third ring member 42. With the drill motor operating in the reverse direction and the operator maintaining a grip on the sleeve 40, the chuck collar 24 is caused to rotate in a counter-clockwise rotation relative to the rotating jaws 18, which causes the jaws 18 to move radially outward from the tool 20. The jaws 18 thus release the tool 20 in a manner similar to the operation described above wherein the jaws 18 grasp the tool 20—except that parts are rotating in the opposite direction. The same knocking effect of the first dog member 30 and the second dog member 38 may be employed to generate sufficient force so that the jaws 18 release their grip on the tool 20.

Referring now to FIG. 4, there may be seen another embodiment of my invention, and like components may be denoted with numerals used in FIGS. 1-3. In FIG. 4, there is shown a second ring member 36 containing a second dog member 38. The second ring member 36 and the third ring member 42 engage lips 46 and 48 respectively on the chuck collar 24. The sleeve 40 may be grasped by an operator to prevent rotational movement of the second ring member 36 and the third ring member 42.

In FIGS. 4, 5, and 6, there is shown a first ring member 64 having a pair of first dog members 66 and 68. The first dog members 66 and 68 each have tapered or inclined surfaces 70 and 72 for enabling the dog members to pass by one another and axially move the first ring member 64 upon engagement with the second dog member 38. As shown in FIG. 6, these inclined surfaces 70 and 72 form an obtuse angle with the top surface of the first ring member 64. In a preferred embodiment of this invention, the obtuse angle of the inclined surface 70 and the inclined surface 72 may be between 120° and 150°.

As shown in FIGS. 4, 5, and 6, the first ring member 64 is shown to contain four radially inward facing projections 63. The projections 63 are designed to fit in corresponding grooves 65 which may be milled into the chuck collar 24. The projections 63 in grooves 65 serve as guide means to prevent rotational movement between the chuck collar 24 and the first ring member 64, while allowing the first ring member 64 to move axially with respect to the chuck member 24.

The operation of the embodiment depicted in FIGS. 4, 5, and 6 is very similar to the operation of the embodiment depicted in FIGS. 1, 2, and 3 as described above. The second ring member 36 and the third ring member 42 may be held stationary while the motor is activated to rotate the first ring member 64. Thus, in a manner similar to the operation previously described, relative rotational movement between the chuck collar 24 and the jaws 18 can be achieved to tighten or release the jaws 18 from the tool 20. The apparatus in FIG. 4 may be added to an existing drill chuck, or may be originally incorporated in the design and manufacture of the drill chuck. In the latter case, other means are possible which will serve to prevent axial movement of the second ring member 36, the sleeve 40, and the third ring member 42 while allowing for rotational movement of these components with respect to the chuck collar 24.

FIG. 7 is a pictorial representation of yet another embodiment of my invention, and again the same numerals will denote similar components from prior figures. In FIG. 7, there is shown a drill chuck 74 having a chuck collar 76. In the manner previously described, rotation of the chuck collar 76 relative to the jaws 18 causes the jaws 18 to clamp or release a tool. A rotatable shaft 78 extends from the drill motor housing 12 for causing rotation of the chuck collar 76 and the jaws 18 when the drill motor is in normal operation.

Referring now to FIGS. 7 and 11, it may be seen that this embodiment includes a first ring member 80 with a pair of downward facing dogs 82 and 84. The first ring member 80 and the first dog members 82 and 84 are secured for rotation with the chuck collar 76. The first dog members 82 and 84 are shown to contain inclined surfaces in the dog members previously discussed. Also secured to the first ring member 80 is an inner spacer 86 which provides additional stability to the first ring member 80. A plate 88 containing notches 90 and 92 is shown below the first ring member 80. Upward axial movement of plate 88 is restricted by the spacer 86. Below the plate 88 is the second ring member 94 containing second dog members 96 and 98 having inclined surfaces. Sandwiched between the plate 88 and the second ring member 94 is an O-ring 100. The tips of the dogs 96 and 98 project through the respective notches 90 and 92 on the plate 88. Four projections 102 extend radially outward from the second ring member 94. These projections 102 and the accompanying grooves 104 in the sleeve 106 allow the second ring member 94 to move axially, but prohibit rotation of the second ring member 94 since the sleeve 106 is secured against rotation.

Below the second ring member 94 is a first disk member 108 and a second disk member 110. Sandwiched between the top of the second disk member 110 and the bottom of the second ring member 94 is an O-ring 112. The first disk member 108 is shown to contain a pair of ramp members 114, and the second disk member 112 is shown to contain a pair of similar ramp members 116. As shown in FIG. 11, each of these ramp members has an inclined portion 118 and a flat portion 120. One or more handle members 122 project from the periphery of the second disk member 110. Also, the first disk member 108 is shown to contain a plurality of apertures 124 so that the first disk member 108 can be secured to the drill motor housing 12 by means of flat head screws 126.

As shown in FIGS. 7, 10, and 11, the bottom portion of the first ring member 80 is shown to abut the top portion of the sleeve 106. If desired, a sealing material (not depicted) may be used between these abutting surfaces to seal this portion of the apparatus from foreign material and reduce vibration. The sleeve 106 may be secured directly to the drill motor housing 12, or may be secured by tack welding to the first disk member 108 which is, in turn, secured to the drill motor housing 12. Thus, the sleeve 106 and the second ring member 94 are secured against rotation, and the first ring member 80 is secured for rotation with the chuck collar 76. The shaft 78 in the drill chuck 74 is elongated as compared to the shaft 16 in the drill chuck 14. Elongation of the shaft 78 is necessary, in part, to accommodate the spacing required for the first disk member 108 and the second disk member 110. As shown in FIG. 10, the apparatus described is enclosed by the first ring member 80 and the stationary sleeve 106. The outer surface of the sleeve 106 may be flush with the outer surface of the first ring member 80. The handle 122 secured to the second disk member 110 projects outwardly from the sleeve 106, and its purpose will be described below.

During normal operations such as drilling, radial movement of the jaws 18 obviously is not desired. In that case, this embodiment of my invention would appear as illustrated in FIG. 8. A first disk member 108 and the sleeve 106 are secured to the housing 12 and therefore cannot rotate. The second disk member 110 is positioned so that the ramp members 114 and 116 do not act to raise the second disk member. The dog 96 of the second ring member 94 is shown projecting slightly through the slot 90 in the plate 88. The O-ring 100 sandwiched between the plate and the second ring member 94 keeps the second ring member 94 in a lower position so that the dog 96 does not engage the dog 82 of the first ring member. Thus, while the drill motor is operating, the first ring member 80 rotates with the chuck collar 76, but the first dog member 82 does not engage the second dog member 96 because the second ring member 94 is in its lower position.

If the tool is to be changed, relative rotational movement is necessary between the chuck collar 76 and the jaws 18. When the operator desires to change the tool, he may simply move the handle 122 to an upper position (to the right as shown in FIG. 10). This movement rotates the second disk member 110 so that the flat portion of the ramps 116 are directly over the flat portion of the ramps 114, as shown in FIG. 9. This movement raises the second disk member 116 to a higher position, which in turn forces the O-ring 112 upward along with the second ring member 94. It may therefore be desirable for the O-ring 100 to be softer or more resilient than the O-ring 112, so that the O-ring 100 compresses to a greater extent than the O-ring 112 under an equal axial force. Upward movement of the second ring member 94 compresses the O-ring 100 between the plate 88 and the second ring member 94. The effect of moving the handle 122 is that the second dog member 96 is raised for engagement with the first dog member 82.

When the rotating dog member 82 engages the stationary dog member 96, rotation of the first ring member 80 in the chuck collar 76 may be briefly interrupted so that relative rotational movement between the chuck collar 76 and the jaws 18 is achieved. The knocking or hammering effect previously described is also possible in this embodiment of the invention. The first dog member 82 may therefore engage the second dog member 96 forcing the second ring member 94 downward by compressing both the O-ring 100 and the O-ring 112. The downward movement of the second ring member 94 allows the dog member 82 to pass by the dog member 96, and thereafter the O-ring 100 and the O-ring 112 again push the second ring member 94 to an upper position so that repeated engagement of the first dog member 82 and the second dog member 96 is possible.

If desired, the flat portion 120 of the ramp members 114 and 116 may be sloped slightly in a direction opposite the inclined portion 118, so that the ramp members 114 and 116 tend to lock when the handle 122 has raised the second disk member 110 to its upper position. In the alternative, the handle member 122 may be locked in an upper position by engagement with a hook or by locking the handle in a slot (not depicted) cut in the sleeve 106. The knocking action of the first dog member 82 and the second dog member 96 will produce a downward force on the second disk member 110. In a suitable embodiment of this invention, the ramp members 114 and 116 are positioned directly below the second dog member 96 so that this knocking or hammering of the dog members will have less of a tendency to bend or damage the second disk member 110.

As previously explained, the second dog members 96 and 98 may project through their respective slots 90 and 92 in the plate 108. If desired, the width of the slots 90 and 92 can control the upward axial movement of the second dog members 96 and 98 so that the first dog members and the second dog members can only engage to the limited extent necessary to achieve the grasping or releasing of the jaws 18 on the tool. In other words, if the slots 90 and 92 are narrowed, the second dog members 96 and 98 cannot project upward as high for engagement with the first dog members. When the second disk member 110 is in its upper position, the top of a plate 88 may abut the bottom of the spacer 86, and thus the extent to which the second dog members 96 and 98 can project through the plate 88 is controlled, in part, by the spacing of the slots 90 and 92.

Although a variety of different materials can be used in farbricating the various components in the apparatus hereinbefore described, metal is particularly suited for all of the components with the exception of the O-rings, 44, 100, and 112, which may be fabricated from rubber. It is within the concept of my invention to provide dog members mounted on a chuck without the use of a ring member. For instance, dog members 30 or 68 may be slidably mounted on the drill chuck collar, in which case the first ring member may be eliminated. Likewise, the dog members 96 and 98 may be slidable mounted on the sleeve 106, and the ring member 94 may be eliminated. The embodiments described above have two dog members on each ring member for providing balance upon engagement of the dog members, however, any number of dog members can be used within the concept of my invention for any of the ring members described.

As previously stated, the instant invention is suitable for opening and closing the jaws on a drill chuck or a universal chuck, and my invention can be utilized with any chuck wherein axial movement of the jaws is controlled by the relative movement of the chuck collar and the jaws. The terms chuck collar and jaws should be broadly construed. Any members intended to grip the tool in a chuck may be referred to as jaws; a chuck collar need not be an external portion of the chuck, but rather is a member in a chuck which may be rotated relative to the jaws to produce radial movement of the jaws for gripping a tool.

My invention is particularly suitable for a chuck which can be powered in either the forward or reverse directions. In this manner, both the opening and the closing of the jaws on the tool can be achieved. It is within the concept of my invention, however, to employ the apparatus described above in connection with a chuck which can only be powered in one direction. In the latter case, either the opening or the closing of the jaws on the tool can be easily achieved in the manner described.

Many other alternative forms of the present invention will be apparent from the foregoing methods and apparatus. Accordingly, the structures and techniques hereinafter depicted and discussed are illustrative only, and are not intended as limitations on the scope of the present invention.

What is claimed is:

1. In a chuck for grasping tools for rotation about an axis with a plurality of jaws, wherein said jaws are radially movable in response to relative rotational movement between a chuck collar and said jaws for changing said tools in said chuck, the improvement comprising:
   a first dog member secured for rotation with said chuck collar,
   a second dog member located adjacent said first dog member and adapted to be secured against rotation with said chuck collar,
   said first and second dog members having tapered engaging surfaces for producing an axial force separating said dog members when said second dog member is secured against rotation while said chuck collar is rotating,
   guide means for allowing axial movement of said first dog member relative to said chuck collar in response to said axial force, and
   resilient means for opposing said axial force and yielding to allow said first dog member to pass by said second dog member.

2. An apparatus as defined in claim 1, further comprising:
   a first ring member secured for rotation with said chuck collar and containing said first dog member, and
   a second ring member axially spaced from said first ring member and containing said second dog member.

3. An apparatus as defined in claim 2, further comprising:
   a third ring member mounted for rotation with said second ring member, and
   an enclosing sleeve member secured to said first ring member and said third ring member.

4. An apparatus as defined in claim 2, wherein said guide means comprises:
   a plurality of inwardly facing projections on said first ring member, and
   a plurality of grooves in said chuck collar for receiving said projections.

5. An apparatus as defined in claim 2, wherein said guide means comprises:
   a plurality of outwardly facing pins on said chuck member, and
   a plurality of slots in said first ring member for receiving said pins.

6. An apparatus as defined in claim 3, wherein said resilient means comprises an O-ring spaced between said first ring member and said third ring member, and said first and second ring members are each provided with a pair of first and second dog members, respectively.

7. In a chuck for grasping tools for rotation about an axis with a plurality of jaws, wherein said jaws are radially movable in response to relative rotational movement between a chuck collar and said jaws for changing said tools in said chuck, the improvement comprising:
   a first dog member secured for rotation with said chuck collar,
   a second dog member located adjacent said first dog member and adapted to be secured against rotation with said chuck collar,
   said first and second dog members having tapered engaging surfaces for producing an axial force separating said dog members when said second dog member is secured against rotation while said chuck collar is rotating,
   guide means for limiting rotational movement of said second dog member and allowing for axial movement of said second dog member relative to said chuck collar in response to said axial force,
   resilient means for opposing said axial force and yielding to allow said first dog member to pass by said second dog member,
   positioning means for axially moving said second dog member toward said first dog member to allow for engagement of said dog members, and
   a sleeve member enclosing said second ring member and said positioning means.

8. An apparatus as defined in claim 7, further comprising:
   a first ring member secured for rotation with said chuck collar and containing said first dog member, and
   a second ring member axially spaced from said first ring member and containing said second dog member.

9. An apparatus as defined in claim 8, wherein said guide means comprises:
   a plurality of outwardly facing projections on said second ring member, and
   a plurality of grooves in said sleeve member for receiving said projections.

10. An apparatus as defined in claim 7, wherein said positioning means comprises:
    a first disc member secured against rotation with said chuck and having a first ramp surface, and
    a second disc member rotatably positionable with respect to said first disc member and having a second ramp surface for engagement with said first ramp surface.

11. An apparatus as defined in claim 10, wherein said resilient means comprises an O-ring spaced between said second ring member and said positioning means.

12. In a chuck for grasping tools for rotation about an axis with a plurality of jaws, wherein said jaws are radially movable in response to relative rotational movement between a chuck collar and said jaws for changing said tools in said chuck, the improvement comprising:
    a first dog member secured for rotation with said chuck collar,
    a second dog member located adjacent said first dog member and adapted to be secured against rotation with said chuck collar,
    said first and second dog members having tapered engaging surfaces for producing an axial force separating said dog members when said second dog member is secured against rotation while said chuck collar is rotating,
    guide means for limiting rotational movement of said second dog member and allowing for axial movement of said second dog member relative to said chuck collar in response to said axial force,
    resilient means for opposing said axial force and yielding to allow said first dog member to pass by said second dog member,
    positioning means for selectively moving one of said dog members axially from a nonengaging first location to a predetermined second location to allow for engagement of said dog members, and
    retaining means for automatically securing said one of said dog members at said second location for engagement of said dog members while said chuck collar is rotating.

13. An apparatus described in claim 12, further comprising:
a sleeve member enclosing said second dog member, said positioning means, and said retaining means.

14. An apparatus as defined in claim 13, wherein said positioning means comprises:

a first disc member secured against rotation with said chuck and having a first ramp surface, a second disc member rotatably positionable with respect to said first disc member and having a second ramp surface for engagement with said first ramp surface, and a handle member affixed to said second disc member and protruding through said sleeve member for rotating said second disc member.

* * * * *